Oct. 16, 1923.　　　　　　　　　　　　　　　　1,470,835
H. H. HATHAWAY
ARTICLE FOR PRODUCING KEYS IN CEMENTWORK
Filed Feb. 4, 1920　　　　3 Sheets-Sheet 1

Harlow H. Hathaway
Inventor

By Lancaster and Allwine
Attorneys

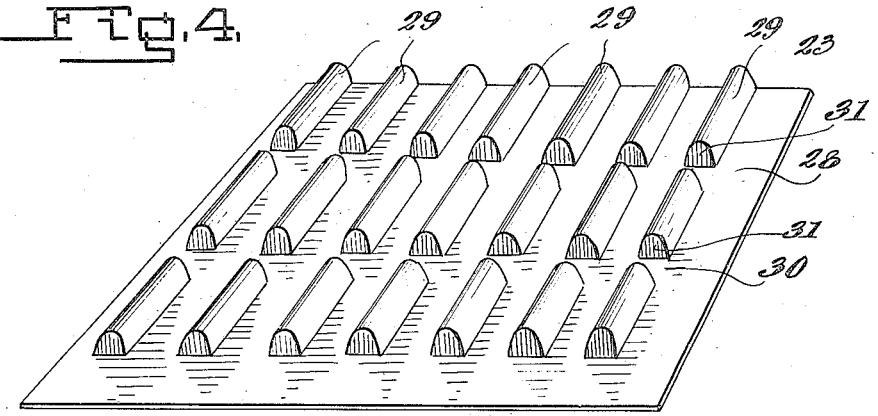
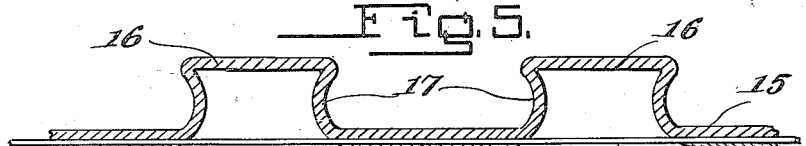
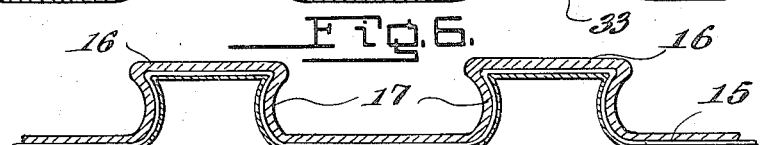
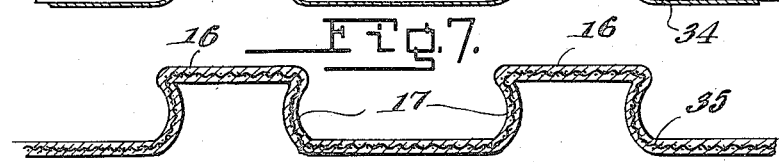
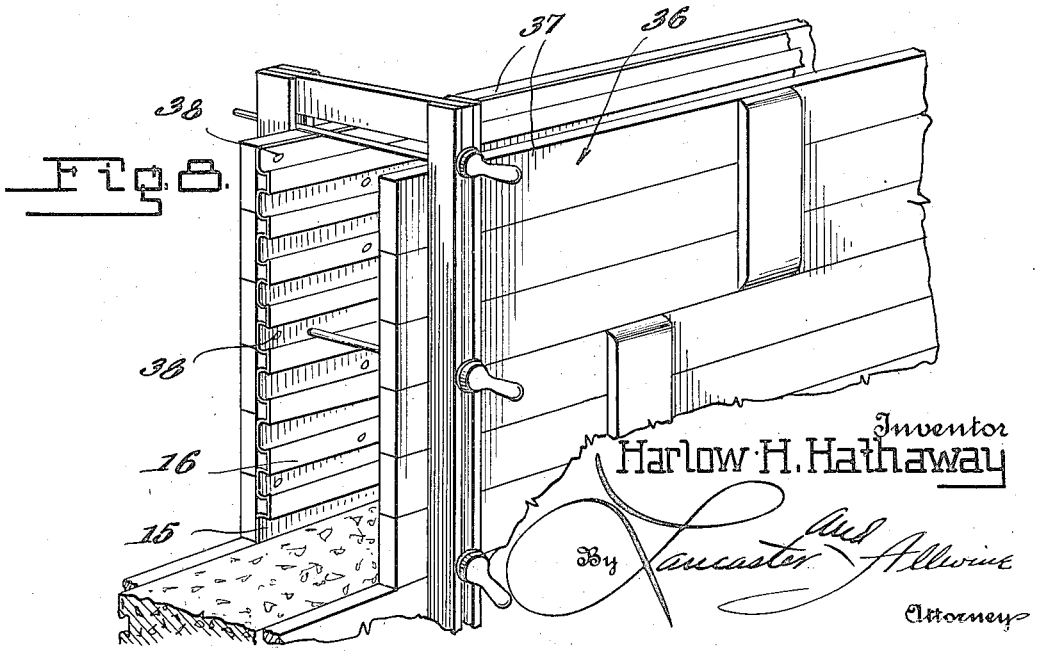

Oct. 16, 1923. 1,470,835
H. H. HATHAWAY
ARTICLE FOR PRODUCING KEYS IN CEMENTWORK
Filed Feb. 4, 1920 3 Sheets-Sheet 3
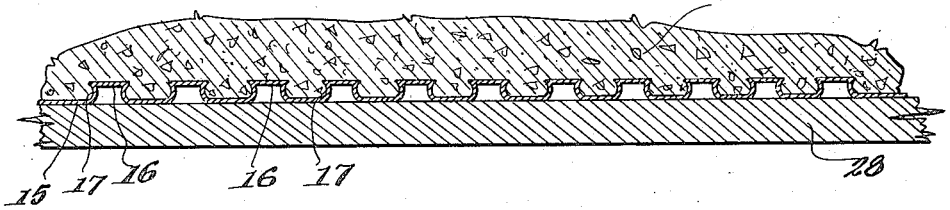
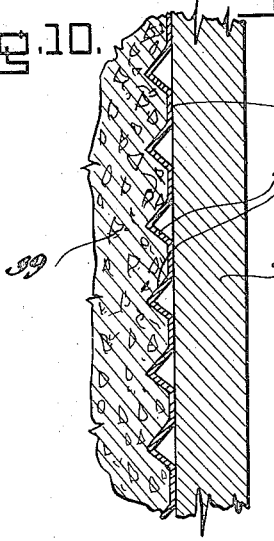 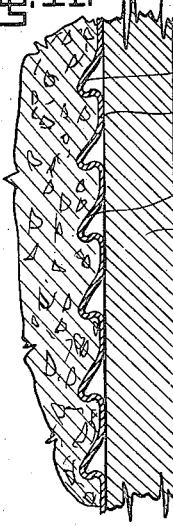 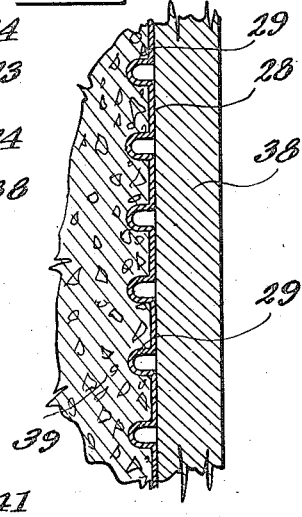
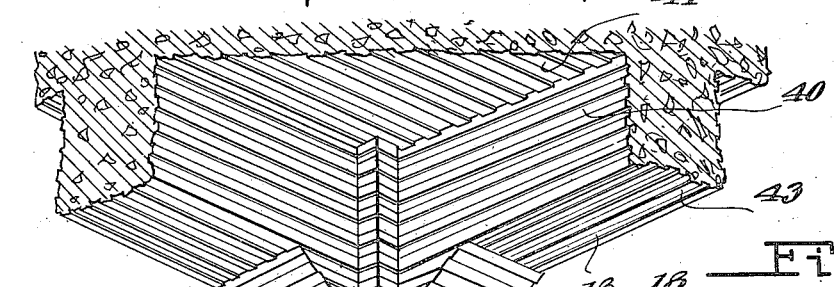
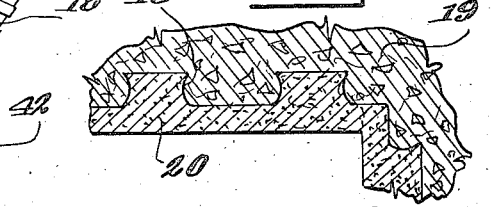
Inventor
Harlow H. Hathaway
By Lancaster Allwine
Attorney Patented Oct. 16, 1923.

1,470,835

UNITED STATES PATENT OFFICE.

HARLOW H. HATHAWAY, OF EL PASO, TEXAS.

ARTICLE FOR PRODUCING KEYS IN CEMENTWORK.

Application filed February 4, 1920. Serial No. 356,171.

*To all whom it may concern:*

Be it known that I, HARLOW H. HATHAWAY, a citizen of the United States, residing at El Paso, in the county of El Paso and State of Texas, have invented certain new and useful Improvements in Articles for Producing Keys in Cementwork, of which the following is a specification.

This invention relates to a device for producing keys in cementitious material, and the primary object of the invention is to provide an improved means for producing indentations or projections in concrete or other cementitious material during the moulding thereof so as to provide means for anchoring a facing thereto such as plaster or the like, and thereby positively preventing the separation of the facing from the concrete under all conditions.

Another object of the invention is to provide a flexible sheet having an irregular surface arranged to be placed against the face of concrete or other cementitious material during the moulding thereof and to be freely removable therefrom after the the concrete has set.

A further object of the invention is to provide a flexible paper sheet having protuberances of any desired configurations stamped, struck out or formed thereon in any manner, which is adapted to be removably secured to the inner surface of a concrete mold or form, so as to provide indentations or protuberances in the concrete during the molding thereof and thereby provide an efficient means for anchoring a facing thereto.

A further object of the invention is to provide an impervious flexible paper sheet having an irregular surface adapted to be secured to the inner surface of a mold for forming indentations or projections on or in the face of the material in the mold and for making the mold practically moisture proof and thereby eliminate the necessity of making the mold itself water proof and permit of cheap lumber and unskilled labor to be used in constructing the mold or form.

A still further object of the invention is to provide an impervious flexible sheet of paper having indentations or projections formed thereon to form keys in the face of a cementitious material during the molding process thereof, which is treated in such a manner as to prevent the adhering of the cementitious material to the sheet and thereby permit the easy removal of the sheet from the material after the same has set.

A still further object of the invention is to provide an improved device for forming keys in cementitious material of the above character, which is durable and efficient in use, one that is simple and easy to manufacture, and one which can be placed upon the market at a reasonable cost.

Other objects of the invention will appear in the following detailed description taken in connection with the drawings, forming a part of this specification, in which drawings:

Figure 4 is a still further form showing the means of providing a key of still different configuration in cementitious material.

Figure 5 is a fragmentary enlarged sectional view through one of the forms showing the means whereby the sheet may be strengthened.

Figure 6 is a fragmentary transverse view showing another form of strengthening the sheet.

Figure 7 is a still further modified form of strengthening the sheet.

Figure 8 is a detail perspective view of a concrete mold or form showing the means for securing the sheets thereto.

Figure 9 is a fragmentary sectional view illustrating the use of the sheet illustrated in Figure 1.

Figure 10 is a fragmentary detail sectional view illustrating the use of the form shown in Figure 2.

Figure 11 is a detail fragmentary sectional view illustrating the use of the form shown in Figure 3.

Figure 12 is a fragmentary sectional view illustrating the use of the form shown in Figure 4.

Figure 13 is a fragmentary detail perspective view showing the appearance of a finished molded concrete structure after the mold and sheets for producing the keys have been removed.

Figure 14 is an enlarged fragmentary sectional view through the concrete construction showing a plaster facing secured thereto.

Figure 1:
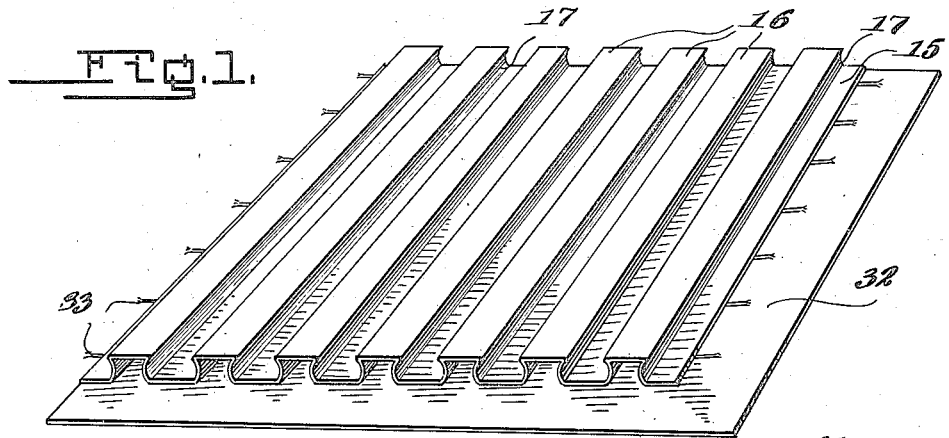
Figure 1 is a fragmentary perspective view of one of the sheets for producing keys in cementitious material.

Referring to the drawings in detail wherein similar reference characters indicate corresponding parts throughout the several views, the numeral 15 indicates a sheet for producing keys in concrete or other cementitious material during the molding thereof, which may be constructed of any preferred flexible material such as paper or the like, which may be rolled, pressed or formed in any desired or preferred manner. The sheet 15 is provided with longitudinally extending ribs or laps 16, the longitudinal side walls of which are arcuately curved as at 17, so as to form under cuts in the keys 18 formed in the molded material, designated by the numeral 19. The undercuts 18 in the molded material forms additional means for holding a plaster or other facing 20 to the face of the molded material, and it is evident that owing to the flexibility of the sheet, the same can be readily removed from the cementitious material no matter what form the keyways formed therein may be. The ribs or laps 16 may be pressed, struck out, or formed in the sheet in any preferred manner as may be desirable to the manufacturer.

Figure 2:
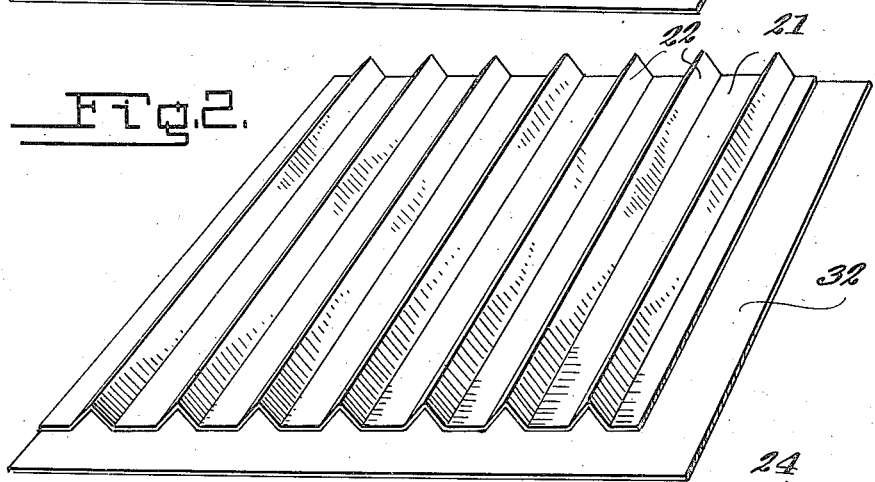
Figure 2 is a similar view showing the means for providing a different form of key in the material.
Figure 3:
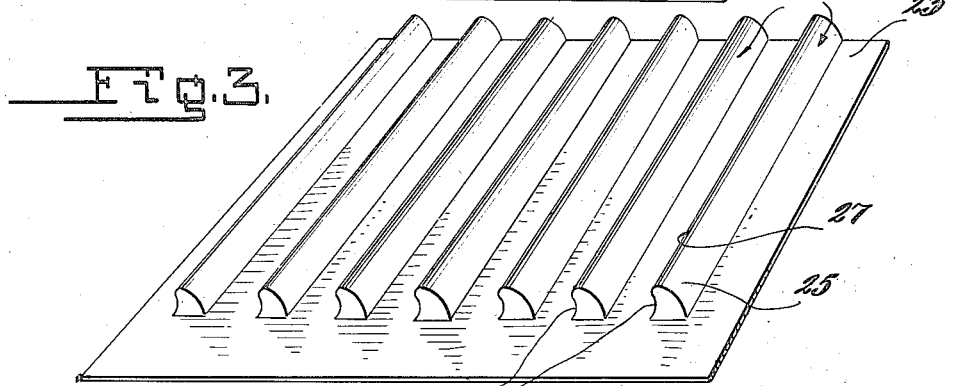
Figure 3 is a similar view showing a still further form for forming a key of different configuration in cementitious material.

It is evident that numerous forms of ribs or laps may be made in the sheets, and in Figures 2 to 4 some of the forms are illustrated. In Figure 2 is shown a flexible sheet 21, which is provided with longitudinally extending V-shaped ribs or laps 22, the V-shaped laps or ribs 22 may be formed by molding, stamping or in any manner that may be desirable.

In Figure 3 is illustrated a flexible sheet 23 having molded, struck out or formed thereon in any preferred manner, the longitudinally extending ribs 24, which preferably end short of one longitudinal edge of the sheet. The ribs 24 are shown provided with outwardly curved faces 25, on one side, and inwardly curved faces 26 on the opposite side. This defines overhanging extensions 27, which are adapted to form ridges in the upper faces of the keys so as to form means for positively locking or anchoring the plaster thereto.

In Figure 4 is illustrated a flexible sheet 28, which is provided with a plurality of spaced rows of longitudinally extending semi-circular ribs 29, and each row of the ribs 29 are separated by transverse spaces 30. Each end of each one of the ribs 29 of the rows are provided with end walls 31, so as to prevent the entrance of the concrete into the ribs during the molding of the concrete.

As stated it is evident that other forms of the ribs or laps may be made such as by providing uniform or irregular indentations or squares or cubes on the sheet, which would provide squares or cubes on the reverse portion of the sheet.

If so desired, the sheets 15, 21, and 23 may be braced by an additional sheet 32, which may be secured thereto by paste. The sheet 32 strengthens the sheets carrying the ribs or laps and prevents the collapsing thereof. If so desired, the sheets, with the ribs or laps may be reinforced themselves, and in Figures 5, 6 and 7 is illustrated means of reinforcing the said sheets. In Figure 5, strands of cords or the like are embedded in the sheet and extend below the ribs or laps formed in the sheet.

In Figure 6 the transversely extending spaced strands of cords 34 are provided which extend through the sheet and through the ribs or laps.

In Figure 7, fiber or fabric 35 is shown embedded directly in the sheet, and projections, ribs or the laps.

The method of forming the keys in the concrete consists in tacking or otherwise securing the sheets provided with the ribs or flaps to the walls of the mold and then pouring the cementitious material therein.

In Figure 8 is illustrated the use of the improved sheet, in connection with a mold which is designated by the numeral 36 and may be of the ordinary or any prefered form or configuration. The sheet which is shown to be of the form illustrated in Figure 1 is secured to the walls 37 of the mold 36, by suitable fastening elements 38 and the cementitious material designated by the numeral 39 is then poured into the form. After the cementitious material has set the form is taken apart and the flexible sheets pulled therefrom.

The flexible sheets are preferably formed impervious to moisture and are treated with wax, paraffin or other material so as to prevent the adhering of the cementitious material thereto. By forming the sheet of impervious material, the same if applied to the walls of a form or mold will make the mold or form waterproof and thereby eliminating the necessity of constructing the mold out of a good grade of timber which does not contain knot holes and the like.

In Figures 9 to 12 are illustrated the various forms of sheets shown in Figures 1, 2, 3, and 4 applied to the walls 38 of a concrete mold or form, and with the cementitious material 39 therein.

In Figure 13 is illustrated the concrete material after the same has been molded and the sheets removed therefrom, and in this figure is illustrated how keys may be formed in a concrete building 40. The building 40 as shown consists of a ceiling 41, the pillars 42, and the beams 43. All of the outer faces of the ceiling, beams, and pillars are provided with the keyways 18.

Inasmuch as the sheets are formed out of flexible material, the same can be readily cut so as to conform to the configuration of any particular type of article being molded and these sheets may be readily cut so as to fit corners, projections and the like.

In Figure 13 is illustrated the plaster 20 placed in position and anchored by the keyway.

If so desired after the paper sheets have been removed from the concrete, the keyways may be painted or otherwise treated with water proofing material so as to keep the dampness in or out of the concrete structure.

From the foregoing description it can be seen that an improved means is provided for forming keys in concrete structures which is exceptionally simple and durable construction, and which can be readily used with any type of concrete mold or form.

Changes in details may be made without departing from the spirit or scope of my invention; but,

I claim:

1. As a new article of manufacture, a device for forming keys in cementitious material comprising a flexible, non-article adhering body, a plurality of flexible and compressible keys formed in the body, and a reinforcing member embedded in the body, said member being flexible, whereby the same can readily conform to the various configurations of said body.

2. As a new article of manufacture, a device for forming keys in cementitious material comprising a flexible non-article adhering body, a plurality of flexible and compressible keys formed in the body, and reinforcing members embedded in the body in spaced relation extending transversely of said compressible keys, said spaced reinforcing members being flexible, whereby the same can readily conform to the various configurations of said body and permit the body to be removed from the cementitious material after the same has set.

HARLOW H. HATHAWAY.